United States Patent
Wille et al.

(10) Patent No.: US 6,236,721 B1
(45) Date of Patent: May 22, 2001

(54) METHOD FOR ROUTE SEARCHING IN TELECOMMUNICATIONS NETWORKS

(75) Inventors: Klaus Wille, München; Robert Stampfl, Hohenkammer; Dirk Blickberndt, München; Alfons Fartmann, Neufahrn/Freising, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/538,799

(22) Filed: Mar. 30, 2000

Related U.S. Application Data

(63) Continuation of application No. PCT/DE98/02285, filed on Aug. 7, 1998.

(30) Foreign Application Priority Data

Sep. 30, 1997  (DE) .............................................. 197 43 361

(51) Int. Cl.[7] .................................................... H04M 3/42

(52) U.S. Cl. ........................ 379/210; 379/211; 379/219; 379/221

(58) Field of Search ...................... 379/210, 211, 379/212, 207, 219, 220, 221; 370/231, 235, 236, 238

(56) References Cited

U.S. PATENT DOCUMENTS

| 4,348,554 | * | 9/1982 | Asmuth | 379/113 |
|---|---|---|---|---|
| 4,873,517 | * | 10/1989 | Baratz et al. | 370/236 |
| 5,014,262 | * | 5/1991 | Harshavardhana | 370/237 |
| 5,018,187 | | 5/1991 | Marinho et al. | 379/221 |
| 5,253,248 | * | 10/1993 | Dravida et al. | 370/228 |
| 5,883,947 | * | 3/1999 | Nakamura | 379/202 |
| 6,111,941 | * | 8/2000 | Schreyer | 379/207 |

FOREIGN PATENT DOCUMENTS

| 195 23 290 A1 | 1/1996 | (DE) . |
|---|---|---|
| 196 10 069 A1 | 9/1997 | (DE) . |
| 0 556 515 A2 | 8/1993 | (EP) . |
| 0 566 209 A1 | 10/1993 | (EP) . |
| 0 616 477 A1 | 9/1994 | (EP) . |

OTHER PUBLICATIONS

Published International Application No. WO 97/31493 (Stumer), dated Aug. 28, 1997.

(List continued on next page.)

Primary Examiner—Ahmad Matar
Assistant Examiner—Benny Q. Tieu
(74) Attorney, Agent, or Firm—Herbert L. Lerner; Laurence A. Greenberg; Werner H. Stemer

(57) ABSTRACT

A method for route searching from a calling subscriber of a first terminal that is connected to a first communications network to a terminal of a called subscriber. In this case, the terminal of the called subscriber, whose address for setting up a call is initiated by the first terminal, is connected to a second communications network. Call diversion to a diversion destination is activated for the terminal of the called subscriber, in which case the diversion destination is not assigned to the second communications network.

10 Claims, 3 Drawing Sheets

OTHER PUBLICATIONS

"Private networking with SOPHO–TBX and SOPHO S systems" (Van Gelder et al.), dated Dec. 1985, XP 002032868, Philips Telecommunication Review, vol. 43, No. 4, pp. 237–252.

"Call Delivery to portable telephones away from home using the local exchange network" (Beller), dated 1991, XP 000269625, pp. 948–953.

"Produktschrift HICOM", Siemens, dated Dec. 1984, System HICOM 600, pertains to the electronic telephone directory HICOM, as mentioned on p. 2 of the specification.

"In zwei Schritten zum 'Corporate Network'", (Kempter et al.), dated Jun 8, 1997, pp. 1–5, pertains to connecting important locations with the Siemens–Communications–Technique, as mentioned on p. 5 of the specification.

"HICOM 300 Networking. Alle Vorteile im Netz", (Siemens), dated Mar. 1996, pertains to a method to connect several HICOM 300 communication systems to form a network, as mentioned on p. 2 of the specification.

* cited by examiner

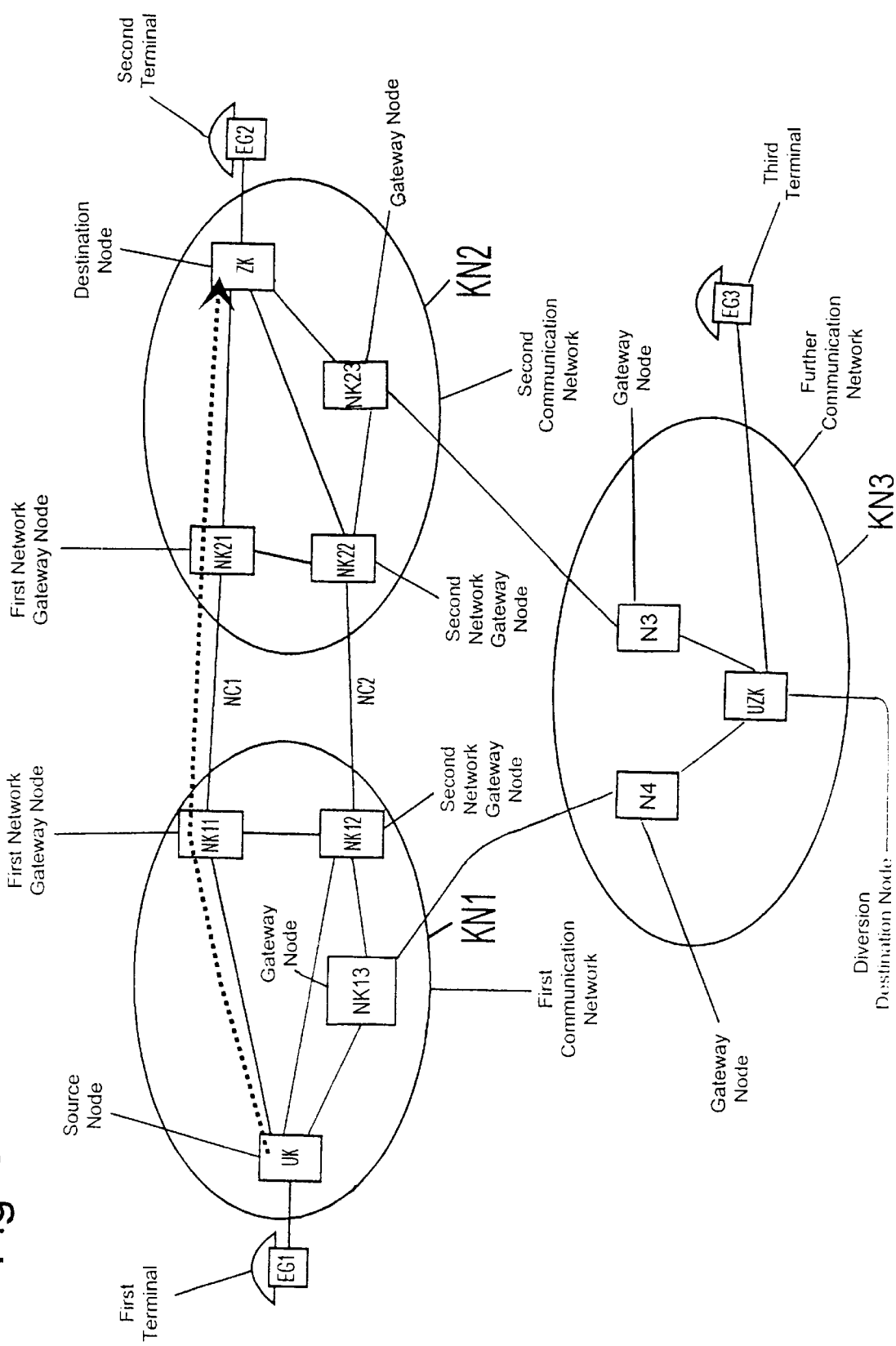

METHOD FOR ROUTE SEARCHING IN TELECOMMUNICATIONS NETWORKS

CROSS-REFERENCE TO RELATED APPLICATION

This is a continuation of copending international application PCT/DE98/02285, filed Aug. 07, 1998, which designated the United States.

BACKGROUND OF THE INVENTION

Field of the Invention

The invention relates, in general, to a method for route searching from a terminal of a calling subscriber, that is connected to a first communications network, to a terminal of a called subscriber that is connected to a second communications network. The method is used in the situation where call diversion to a diversion destination is activated for the terminal of the called subscriber. For setting up the call, the address of the terminal of the called subscriber is initiated by the terminal of the calling subscriber. In particular, the invention relates to a method for route searching when the terminal of the calling subscriber and the diversion destination are not in the communications network to which the terminal of the called subscriber is assigned.

For example, the "HICOM 600 System" product document from Siemens AG, Order Number A19100-K3161-G430-01 describes a communications system which provides the service features of call diversion and automatic call forwarding (pages 29 and 38). The service feature of call diversion means that a call to a terminal whose call line is activated is diverted to a selected destination terminal. The "HICOM 300 Networking" product document from Siemens AG, Order Number A31001-W-A30, also describes the interconnecting communications systems to form a network and providing locally available service features throughout the network, so that call diversion is possible to a terminal assigned to this network.

If a subscriber network including such communications systems is connected to a public communications network, calls may be diverted from a terminal that is connected to the subscriber network to terminals that are connected to this specific subscriber network and also to terminals that are connected to the public communications network. If the terminal of a calling subscriber is connected to the public communications network and the terminal of a called subscriber, for which call diversion to a diversion destination is activated, is connected to the subscriber network, then a route searching procedure can be carried out to determine the route to the diversion destination in the subscriber network or in the public communications network. If the route searching procedure is carried out in the public communications network, then the address of the diversion destination is transmitted back to the network node to which the terminal of the calling subscriber is assigned. Starting from this network node, a new connection is set up to the network node to which the diversion destination is assigned.

Depending on the network association of the terminals of the calling subscriber, of the called subscriber, and of the diversion destination, an operator of a subscriber network incurs a different cost when the route searching procedure is carried out in the external communications network than when the route searching procedure is carried out in its own communications network.

If the terminal of the calling subscriber and the diversion destination are assigned to the public communications network and the terminal of the called subscriber is assigned to the subscriber network, and if the diversion destination can be reached from the subscriber network via the same network gateway via which the incoming call is made, then two connections of the network gateway group from the public communications network to the subscriber network are used for initializing the route searching procedure in one's own subscriber network. If, for example, the terminal of the calling subscriber and the diversion destination are assigned to a communications network in Hamburg, and if the terminal of the called subscriber is connected to a subscriber network in Munich, then, when the route searching procedure is carried out in the subscriber network in Munich, two trunk connections are used from Hamburg to Munich, and vice versa, even though only one local connection would be required in Hamburg. The subscriber network operator thus incurs costs for the connection from Munich to Hamburg via the public communications network. If, on the other hand, the diversion destination is assigned to one's own subscriber network, and if the route searching procedure is carried out in the external communications network, then the subscriber network operator incurs higher costs than if the route searching procedure were carried out in his own subscriber network.

In order to avoid the last problem described above, a comparison of subscriber call number sequences for the diversion destination with corresponding subscriber call number sequences in the subscriber network can be carried out in one's own subscriber network. If the two sequences match, then the diversion destination is in one's own subscriber network, and a route searching procedure can be carried out in one's own subscriber network. If the call number information items differ from one another, then the route searching procedure should be carried out in the external communications network.

"In zwei Schritten zum 'Corporate Network'" [In two steps to the "Corporate Network"], telecom report 19 Issue 3, 1996, Siemens AG Berlin and Munich describes a private communications network. This private communications network (ISDN network) comprises a plurality of network nodes, which each have a unique node identity (for example node 3 Burda media). The communications network is connected to the public communications network via various S2M exchange accesses in different towns. In addition, the private communications network has a direct link to a GSM mobile radio network (D1, D2) via a GSM output.

SUMMARY OF THE INVENTION

It is accordingly an object of the invention to provide a method for route searching when the terminal of the calling subscriber and the diversion destination are not in the communications network to which the terminal of the called subscriber is assigned which overcomes the hereinaforementioned disadvantages of the heretofore-known methods of this general type.

With the foregoing and other objects in view there is provided, in accordance with the invention, a method for route searching from a calling terminal to a diversion destination. The method includes using a first communication network having a calling terminal connected thereto. A second communication network having a called terminal connected thereto is used. The first communication network and the second communication network have network nodes which each have a unique node identity. A diversion destination that is not located on the second communication network is provided. The diversion destination is set on the called terminal and the diversion destination is provided with a diversion destination address. An intended call is set up from the calling terminal to the called terminal using a first network node combination of at least some of the network nodes. A further network node combination of at least some of the network nodes is used. The further network node combination is different from the first network node combination. Based on the diversion destination address, on the unique node identities of the network nodes of the first network node combination, and on the unique node identities of the network nodes of the of the further network node combination, the length of a route from the second communication network to the diversion destination via the further network node combination and the length of a route from the second communication network to the diversion destination via the first network node combination are determined. If the length of the route from the second communication network to the diversion destination via the further network node combination is shorter than the length of a route from the second communication network to the diversion destination via the first network node combination, then in the second communication network, a route searching procedure is performed to the diversion destination.

A connection is set up from a calling terminal connected to a first communications network, to a called terminal connected to a second communications network, from the first communications network to the second communications network via a first network node combination. A network node combination comprises two network gateway nodes which are connected to one another via a cable and are assigned to different communications networks.

The first and the second communications networks are additionally connected to one another via at least one second network node combination, or a link to a further communications network exists from the first communications network and from the second communications network, via in each case at least one further network node combination.

The network nodes in the first, second and further communications networks have unique node identities, which are normally in each case known only in their own communications network.

If the called terminal activates a call diversion to a diversion destination with a diversion destination address, in which case the diversion destination may be assigned to a diversion destination node in the first or in the further communications network, the connection is cleared on the basis of the destination node to which the called terminal is connected, in the direction of the source node to which the calling terminal is connected, as far as a first network gateway node of the first network node combination in the second communications network. The node numbers of the network node combinations and the node number of the diversion destination node are used in this network to determine the length of the different routes, starting from a network node combination, to the diversion destination node. If the route via the first network node combination to the diversion destination node is shorter than the route via the second or a further network node combination to the diversion destination node, then a route searching procedure is carried out in order to determine the route to the diversion destination node in the first communications network. Otherwise, the route searching procedure is carried out in the second communications network.

A major advantage of the method according to the invention is that, when determining a route to a diversion destination, it is always possible to choose the route which represents the most cost-effective alternative for the operator of one's own network.

If the diversion destination is assigned to the first communications network and if the length of the route via the second network node combination to the diversion destination node is shorter than the length of the route via the first network node combination to the diversion destination node then, in an advantageous refinement of the method according to the invention, the route starts from the first network gateway node of the first network node combination in the second communications network, and passes via the second network node combination to the diversion destination node.

If the diversion destination is assigned to the further communications network and if the length of the route via the further network node combination from the second communications network to the further communications network to the diversion destination node is shorter than the length of the route via the first network node combination to the diversion destination node, then the route starts from the first network gateway node of the first network node combination in the second communications network, and passes via the further network node combination from the second communications network to the further communications network and to the diversion destination node.

With the foregoing and other objects in view there is provided, in accordance with the invention, another embodiment of the method for route searching from a calling terminal to a diversion destination. A first communication network having a calling terminal connected thereto is used. A second communication network having a called terminal connected thereto is used. The first communication network and the second communication network have network nodes which each have a unique node identity. A diversion destination that is not located on the second communication network is provided. The diversion destination is set on the called terminal and the diversion destination is provided with a diversion destination address. An intended call is set up from the calling terminal to the called terminal using a first network node combination including network nodes that each have a unique node identity. A second network node combination from the first communication network to a further communication network is used. The second network node combination includes network nodes that each have a unique node identity. A third network node combination from the second communication network to the further communication network is used. The third network node combination includes network nodes that each have a unique node identity. Based on the diversion destination address, on the unique node identities of the network nodes of the first network node combination, and on the unique node identities of the network nodes of the of the third network node combination, a length of a route from the second communication network to the diversion destination via the third network node combination and a length of a route from the second communication network to the diversion destination via the first network node combination are determined. If the length of the route from the second communication network to the diversion destination via the third network node combination is shorter than the length of a route from the second communication network to the diversion destination via the first network node combination, then in the second communication network, a route searching procedure to the diversion destination is performed.

In accordance with a concomitant feature of the invention, it is possible to use the following as the criteria for the length of a route: the charges incurred for the respective route in an external communications network, the number of network nodes which the respective route has to pass through, and/or the local distance between the diversion destination node and the respective network node combination.

Other features which are considered as characteristic for the invention are set forth in the appended claims.

although the invention is illustrated and described herein as embodied in a method for route searching in telecommunications networks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 shows a schematic illustration of communication networks where a diversion destination has been assigned to a further communication network.

DESCRIPTION OF THE PREFERRED EMBODIMENTS

Figure 1:
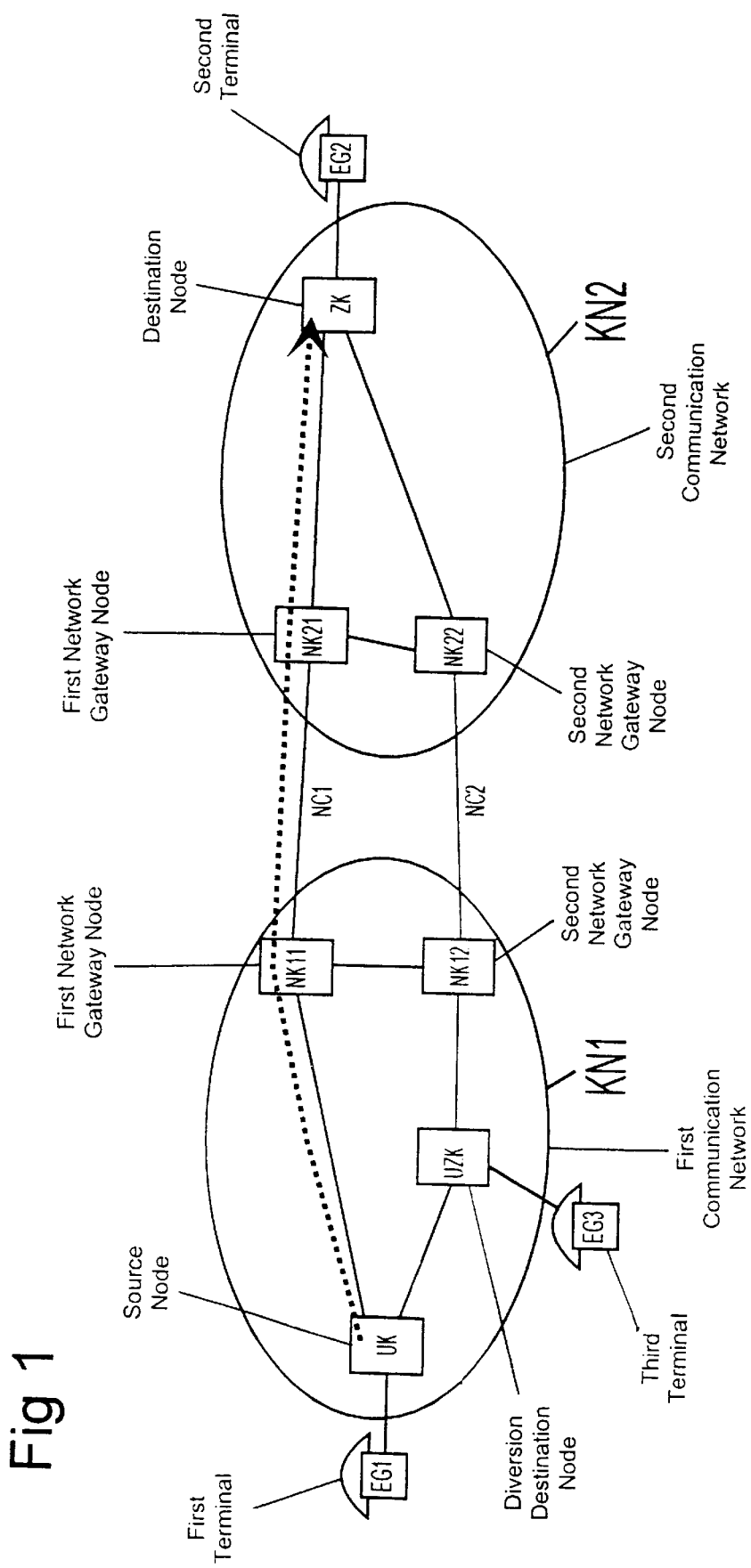
FIG. 1 shows a schematic illustration of two communication networks that are connected to one another via two network gateways.

Referring now to the drawings of the figures in detail, and first, particularly to FIG. 1 thereof, there is seen a configuration comprising two communications networks KN1, KN2 which are connected to one another via two network node combinations (NK11, NK21) and (NK12, NK22). The first communications network KN1 (for example a public communications network) has a first network gateway node NK11 and a second network gateway node NK12 for providing a connection to the second communications network KN2. The second communications network KN2 (for example a private subscriber network) likewise has a first network gateway node NK21 and a second network gateway node NK22 for providing a connection to the first communications network KN1. The first network gateway node NK11 in the first communications network KN1 is connected via a cable NC1 to the first network gateway node NK21 of the second communications network KN2. The second network gateway node NK12 in the first communications network KN1 is connected via a cable NC2 to the second network gateway node NK22 of the second communications network KN2.

Let us assume that a connection is intended to be set up from a first terminal EG1, which is connected via a source node UK to the first communications network KN1, to a second terminal EG2, which is connected via a destination node ZK to the second communications network KN2 (see dashed line). Call diversion to a third terminal EG3 is activated for the second terminal EG2, and this third terminal EG3 is connected to the first communications network KN1 via a diversion destination node UZK.

When a connection is set up from the first terminal EG1 to the second terminal EG2 via the first network node combination NK11, NK21 to the destination node ZK, a transmitted subscriber call number of the first terminal EG1 in the first network gateway node NK21 of the second communications network KN2 has been added to a proxy node number, which uniquely identifies the first network gateway node NK11 of the first communications network KN1.

Figure 2:
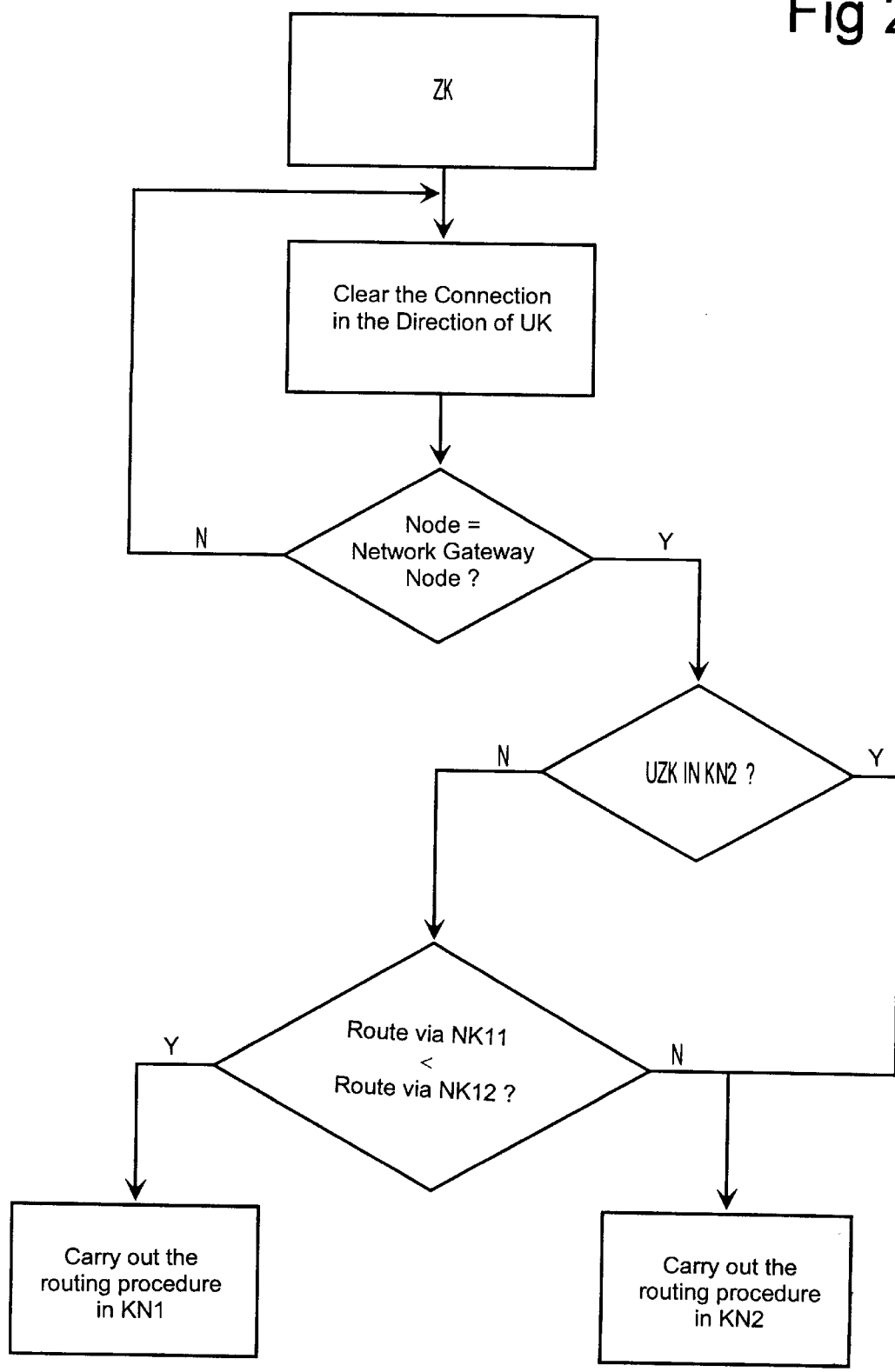
FIG. 2 shows a flowchart of the method steps that are carried out when call diversion is activated.

FIG. 2 shows the method steps that are carried out when call diversion has been activated for the second terminal EG2. Starting from the destination node ZK, the connection is cleared between the first terminal EG1 and the second terminal EG2 in the direction of the source node UK as far as the first network gateway node NK21 of the second communications network KN2. A check is carried out in this network gateway node NK21 to determine whether the diversion destination node UZK is assigned to the first communications network KN1 or to the second communications network KN2. If the diversion destination node UZK is a network node in the second communications network KN2, then a route searching procedure is carried out for the route to the diversion destination node UZK (not shown in KN2) in the second communications network KN2. If the diversion destination node UZK is a network node in the first communications network KN1, then the proxy node number of the first network gateway node NK11 of the first communications network KN1 is used to determine the length of a first route, starting from the first network gateway node NK11 of the first communications network KN1 to the diversion destination node UZK, and the proxy node number of the second network gateway node NK12 of the first communications network KN1 is used to determine the length of a second route, starting from the second network gateway node NK12 of the first communications network KN1, to the diversion destination node UZK. If the first route is shorter than the second route, then a route searching procedure is carried out to determine the route to the diversion destination node UZK in the first communications network KN1. If the first route is longer than the second route, then the route searching procedure is carried out in the second communications network KN2.

In the example above, the route starts from the first network gateway node NK21 of the second communications network KN2, and passes via the second network node combination NK12, NK22 to the diversion destination node UZK.

FIG. 3 shows a configuration that is similar to that shown in FIG. 1 and that includes three communication networks KN1, KN2, and KN3. The difference in the configuration is that call diversion is activated from the second terminal EG2 to a third terminal EG3 that is connected to a diversion destination node UZK in a third or further communication network KN3. The third communication network KN3 includes network gateway nodes NK4 and NK3 which provide respective connections to the first communication network KN1 via the gateway node NK13 and to the second communication network NK2 via the gateway node NK23.

We claim:

1. A method for route searching from a calling terminal to a diversion destination, which comprises:
   providing the use of a first communication network having a calling terminal connected thereto;
   providing the use of a second communication network having a called terminal connected thereto, the first communication network and the second communication network having network nodes which each have a unique node identity;
   providing a diversion destination that is not located on the second communication network;
   setting the diversion destination on the called terminal and providing the diversion destination with a diversion destination address;

setting up an intended call from the calling terminal to the called terminal using a first network node combination of at least some of the network nodes;

providing the use of a further network node combination of at least some of the network nodes, the further network node combination being different from the first network node combination;

based on the diversion destination address, on the unique node identities of the network nodes of the first network node combination, and on the unique node identities of the network nodes of the of the further network node combination, determining a length of a route from the second communication network to the diversion destination via the further network node combination and determining a length of a route from the second communication network to the diversion destination via the first network node combination; and if the length of the route from the second communication network to the diversion destination via the further network node combination is shorter than the length of a route from the second communication network to the diversion destination via the first network node combination, then in the second communication network, performing a route searching procedure to the diversion destination.

2. The method according to claim 1, wherein if the route searching procedure is performed, a route to the diversion destination passes via the further network node combination to the diversion destination.

3. The method according to claim 1, wherein the length of the route from the second communication network to the diversion destination via the first network node combination and the length of the route from the second communication network to the diversion destination via the further network node combination are determined by the charges incurred for the route.

4. The method according to claim 1, wherein the length of the route from the second communication network to the diversion destination via the first network node combination and the length of the route from the second communication network to the diversion destination via the further network node combination are determined by the number of network nodes through which the route passes.

5. The method according to claim 1, wherein the length of the route from the second communication network to the diversion destination via the first network node combination and the length of the route from the second communication network to the diversion destination via the further network node combination are determined by the local distance between the diversion destination and the network node combination.

6. A method for route searching from a calling terminal to a diversion destination, which comprises:

providing the use of a first communication network having a calling terminal connected thereto;

providing the use of a second communication network having a called terminal connected thereto, the first communication network and the second communication network having network nodes which each have a unique node identity;

providing a diversion destination that is not located on the second communication network;

setting the diversion destination on the called terminal and providing the diversion destination with a diversion destination address;

setting up an intended call from the calling terminal to the called terminal using a first network node combination including network nodes that each have a unique node identity;

providing the use of a second network node combination from the first communication network to a further communication network, the second network node combination including network nodes that each have a unique node identity;

providing the use of a third network node combination from the second communication network to the further communication network, the third network node combination including network nodes that each have a unique node identity;

based on the diversion destination address, on the unique node identities of the network nodes of the first network node combination, and on the unique node identities of the network nodes of the of the third network node combination, determining a length of a route from the second communication network to the diversion destination via the third network node combination and determining a length of a route from the second communication network to the diversion destination via the first network node combination; and if the length of the route from the second communication network to the diversion destination via the third network node combination is shorter than the length of a route from the second communication network to the diversion destination via the first network node combination, then in the second communication network, performing a route searching procedure to the diversion destination.

7. The method according to claim 6, wherein if the route searching procedure is performed, a route to the diversion destination passes via the third network node combination to the diversion destination.

8. The method according to claim 6, wherein the length of the route from the second communication network to the diversion destination via the first network node combination and the length of the route from the second communication network to the diversion destination via the third network node combination are determined by the charges incurred for the route.

9. The method according to claim 6, wherein the length of the route from the second communication network to the diversion destination via the first network node combination and the length of the route from the second communication network to the diversion destination via the third network node combination are determined by the number of network nodes through which the route passes.

10. The method according to claim 6, wherein the length of the route from the second communication network to the diversion destination via the first network node combination and the length of the route from the second communication network to the diversion destination via the third network node combination are determined by the local distance between the diversion destination and the network node combination.

* * * * *